United States Patent
Szolyga

(10) Patent No.: US 6,970,349 B2
(45) Date of Patent: Nov. 29, 2005

(54) EXPANDALE MODULAR STORAGE UNIT

(75) Inventor: Thomas Szolyga, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 9 days.

(21) Appl. No.: 10/394,349

(22) Filed: Mar. 21, 2003

(65) Prior Publication Data

US 2004/0184230 A1 Sep. 23, 2004

(51) Int. Cl.$^7$ ............................................. G06F 1/16
(52) U.S. Cl. ................................. 361/683; 361/684
(58) Field of Search .................................. 361/683–686

(56) References Cited

U.S. PATENT DOCUMENTS

| | | | |
|---|---|---|---|
| 4,811,275 A | * | 3/1989 | Balogh et al. ............... 710/316 |
| 5,926,209 A | | 7/1999 | Glatt |
| 6,476,858 B1 | | 11/2002 | Ramirez Diaz et al. |
| 6,658,516 B2 | * | 12/2003 | Yao ............................. 710/301 |
| 2002/0129179 A1 | * | 9/2002 | Chen et al. | |

* cited by examiner

Primary Examiner—Yean-Hsi Chang

(57) ABSTRACT

The present invention includes an expandable modular storage unit for a computer system. According to the present invention, the expandable modular storage unit includes a backplane capable of being coupled to a host computer system. A plurality of storage modules can be coupled to the backplane for communicating with the host computer system whereby the storage modules can communicate with each other and the host computer system. Through the use of the present invention, large amounts of data storage capability can be added to an existing system without the added expense of controller electronics and related software. An aspect of the present invention includes an expandable modular storage unit. The expandable modular storage unit includes a backplane and at least one storage module storage module coupled to the backplane wherein the at least one storage module includes communication means for communicating with at least one other storage module coupled to the backplane.

5 Claims, 7 Drawing Sheets

EXPANDALE MODULAR STORAGE UNIT

FIELD OF THE INVENTION

The present invention relates to data storage systems, and more particularly to an expandable modular storage unit.

BACKGROUND OF THE INVENTION

Computers have become an integral tool used in a wide variety of different applications, such as in finance and commercial transactions, three-dimensional and real-time graphics, computer-aided design and manufacturing, healthcare, telecommunications, education, etc. Computers are finding new applications as performance and speeds ever increase while costs decrease due to advances in hardware technology and rapid software development.

As is known in the art, large mainframe, or host, computer systems require large capacity data storage systems. These large mainframe, or host computer systems generally include controllers and software which perform many operations on data introduced to the computer system through peripherals including the data storage system. The results of these operations are output to peripherals, including the storage system.

FIG. 1 is a block diagram of a conventional data storage system 100. The data storage system includes a host computer 110, embedded software 120, first and second controllers 130, 140 and first and second hard disk drives 150, 160. The first and second hard drives 150, 160 are respectively coupled to the first and second controllers 130, 140 wherein the first and second controllers 130, 140 are coupled to the embedded software 120.

During operation, the host computer 110 has separate access to the first and second hard drives 150, 160 via the software 120 and the first and second controllers 130, 140 respectively. Sometimes, however, a system user will need to increase the data storage capacity of the existing system. In order to accomplish this, the user will have to purchase not only the hard drive, but must incur the cost of software and a controller along with the related electronics. Consequently, the cost of adding storage to the system will exceed the cost per megabyte of memory based on the cost of the software and the controller.

Accordingly, what is needed is an expandable data storage system whereby the cost of adding storage to the system is as close to the actual cost per megabyte of memory being added as possible. The data storage system should be simple, cost effective and capable of being easily adapted to existing technology. The present invention addresses these needs.

SUMMARY OF THE INVENTION

The present invention includes an expandable modular storage unit for a computer system. According to the present invention, the expandable modular storage unit includes a backplane capable of being coupled to a host computer system. A plurality of storage modules can be coupled to the backplane for communicating with the host computer system whereby the storage modules can communicate with each other and the host computer system. Through the use of the present invention, large amounts of data storage capability can be added to an existing system without the added expense of controller electronics and related software.

A first aspect of the present invention includes an expandable modular storage unit. The expandable modular storage unit includes a backplane and at least one storage module coupled to the backplane wherein the at least one storage module includes communication means for communicating with at least one other storage module coupled to the backplane.

A second aspect of the present invention includes an expandable computer system. The expandable computer system includes a host computer system and an expandable storage unit coupled to the host computer system wherein the expandable modular storage unit includes a backplane and at least one storage module coupled to the backplane wherein the at least one storage module includes communication means for communicating with at least one other storage module coupled to the backplane.

A third aspect of the present invention includes an expandable modular storage unit. The expandable modular storage unit includes a backplane and a storage module coupled to the backplane wherein the storage module includes a hard disk drive and an interface board coupled to the hard disk drive wherein the interface board is capable of communicating with at least one other storage module coupled to the backplane.

A fourth aspect of the present invention includes a storage module. The storage module includes a hard disk drive and an interface board coupled to the hard disk drive wherein the interface board is capable of communicating with multiple storage modules.

Other aspects and advantages of the present invention will become apparent from the following detailed description, taken in conjunction with the accompanying drawings, illustrating by way of example the principles of the invention.

DETAILED DESCRIPTION

The present invention relates to an expandable modular storage unit for a computer system. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention includes an expandable modular storage unit for a computer system. According to the present invention, the expandable modular storage unit includes a backplane capable of being coupled to a host computer system. A plurality of storage modules can be coupled to the backplane for communicating with the host computer system whereby the storage modules can communicate with each other and the host computer system. Through the use of the present invention, large amounts of data storage capability can be added to an existing system without the added expense of controller electronics and related software.

Figure 1:
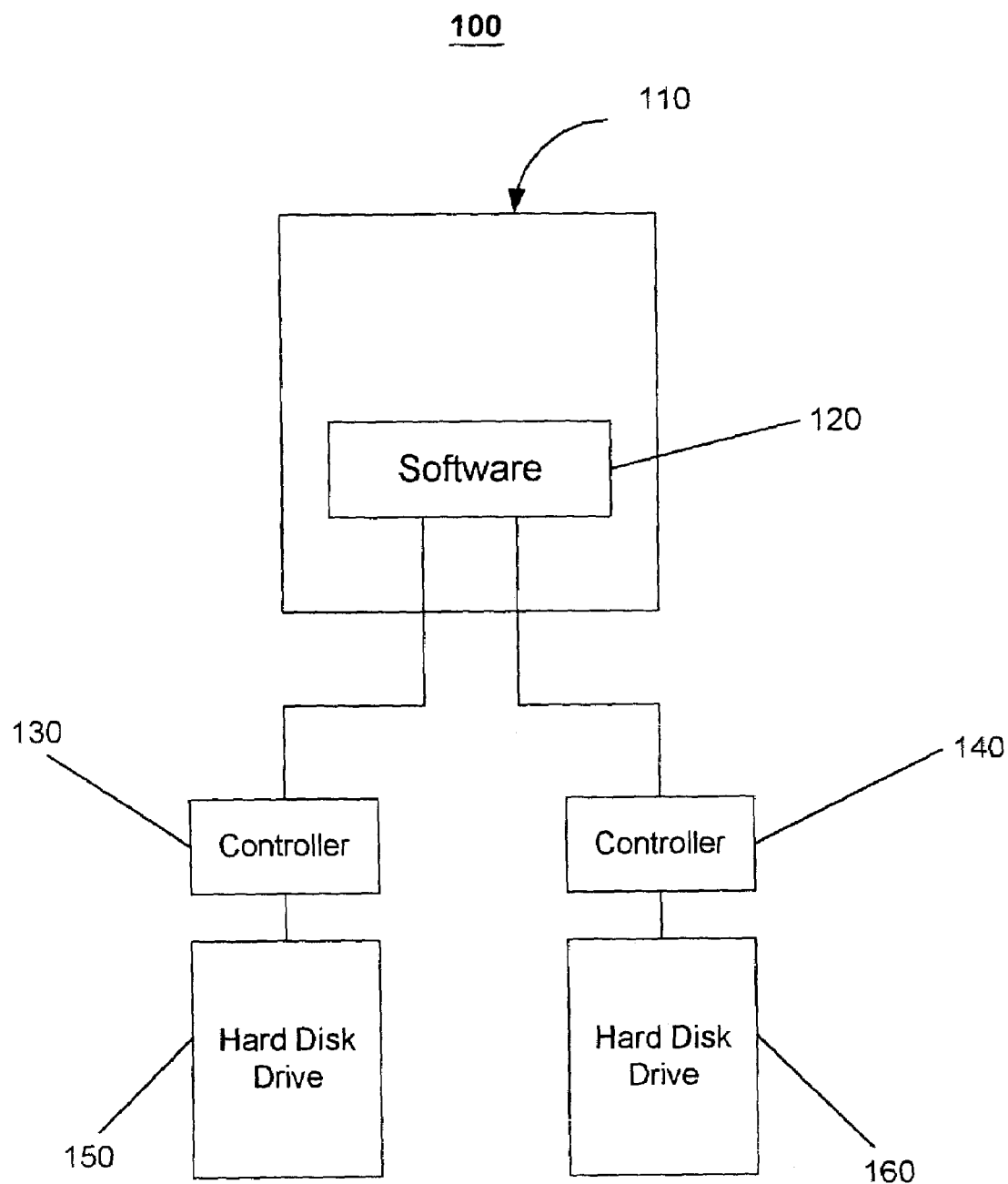
FIG. 1 is a block diagram of a conventional data storage system.
Figure 2:
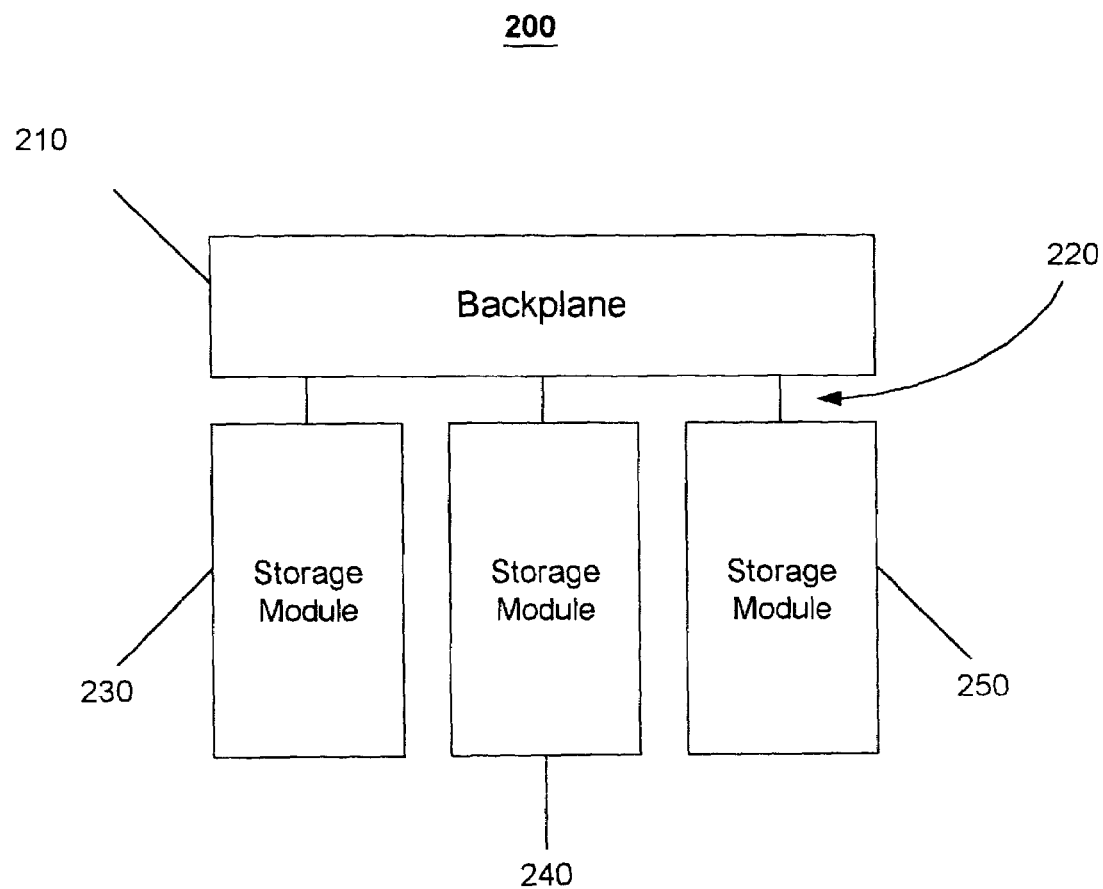
FIG. 2 is a block diagram of an expandable modular storage unit in accordance with an embodiment of the present invention.

FIG. 2 shows an expandable modular storage unit 200 in accordance with the present invention. The expandable modular storage unit 200 includes a backplane circuit board ("backplane") 210 and a plurality of storage modules 230, 240, 250. In an embodiment, each of the plurality of storage modules 230, 240, 250 is coupled to the backplane 210 via one of a plurality of connectors 220. In an embodiment, the connectors 220 are socket-type connectors.

In an embodiment, the backplane 210 is an interconnecting device that may or may not have intelligence. A passive backplane adds no processing while an intelligent or active backplane, may have microprocessor or controller-driven circuitry that adds a little or a lot of processing. In an embodiment, the backplane 210 provides a parallel data transfer path between the storage modules 230, 240, 250. These are called daisy chain connection paths and will be described in further detail later.

Figure 3:
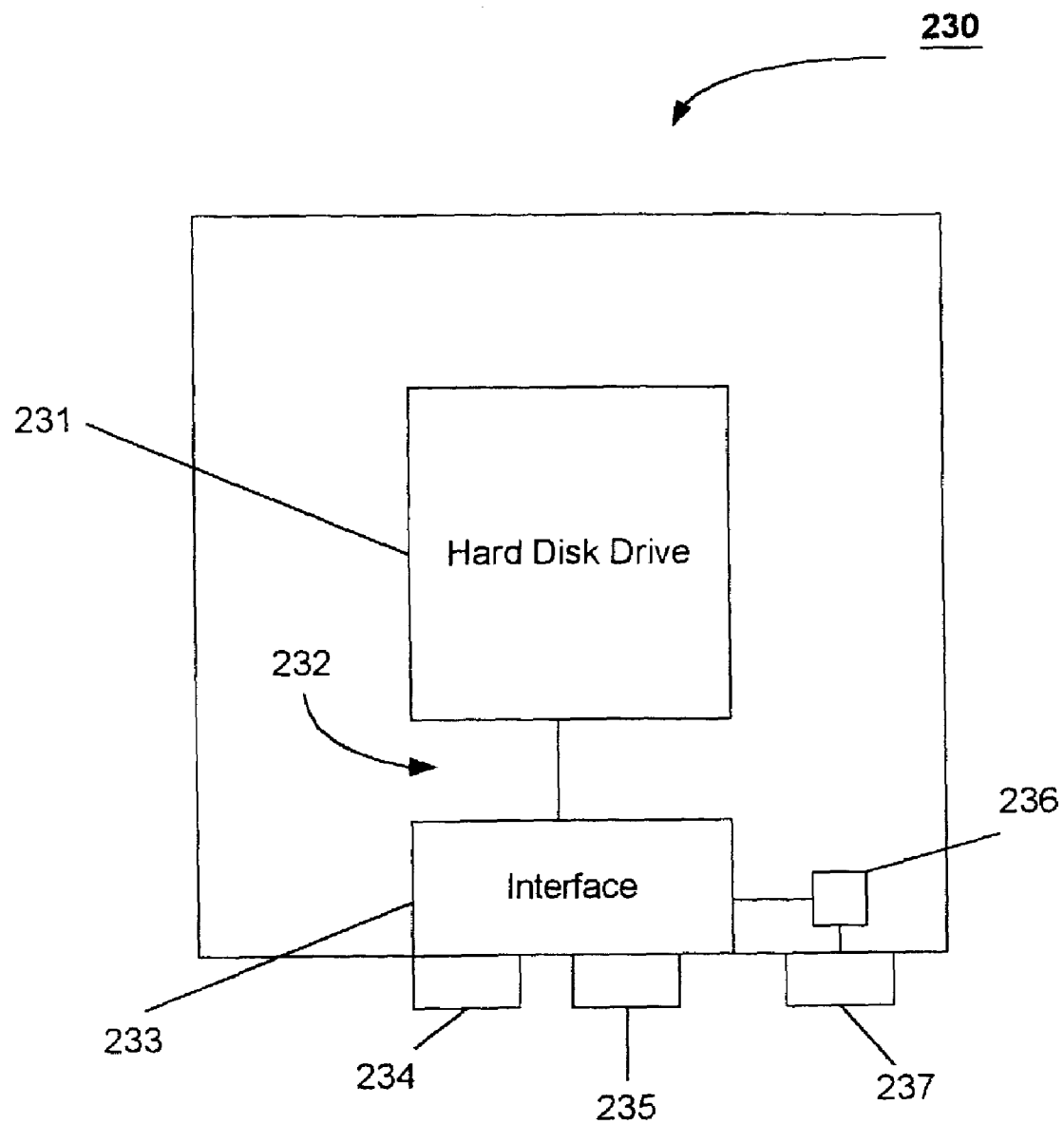
FIG. 3 is a block diagram of a storage module in accordance with an embodiment of the present invention.

FIG. 3 is a block diagram of the storage module 230 in accordance with an embodiment of the present invention. It should be understood that storage modules 240 and 250 could include components similar to those in storage module 230. In an embodiment, the storage module 230 includes a Hard Disk Drive (HDD) 231, an interface 233, two data connectors 234, 235, a power source 236 and a power connector 237. The HDD 231 can be coupled to the interface 233 via a cable 232 or similar means and the interface 233 is coupled to the two data connectors 234, 235. The interface 233 is further connected to the power source 236 wherein the power source 236 is coupled to the power connector 237.

In an embodiment, the HDD 231 is a hard disk drive in accordance with the Integrated Drive Electronics (IDE) standard. IDE is a type of hardware interface widely used to connect hard disks, CD-ROMs and tape drives to a PC. IDE is very popular because it is an economical way to connect peripherals.

Utilizing IDE, the controller electronics are typically built into the drive itself, requiring a simple circuit in the PC for connection. IDE drives were attached to earlier PCs using an IDE host adapter card. Today, two Enhanced IDE (EIDE) sockets are built onto the motherboard of the PC and each socket connects one or two drives via a 40-pin ribbon cable. By setting jumpers on the units, a single drive is configured as the master. If a second drive is connected to the same cable and socket, it must be configured as the slave.

In another IDE configuration, the 40-pin IDE cable has one of the wires cut between the second and third connectors. Accordingly, the drive at the end of the cable does not see a signal on this wire and becomes the master. The drive in the middle of the cable sees a signal on this wire and becomes the slave. In this way, all drives can be jumpered the same whereby the drives' position on the cable determines the master/slave relationship.

The IDE interface is officially known as the ATA (AT Attachment) specification. ATAPI (ATA Packet Interface) defines the IDE standard for CD-ROMs and tape drives. ATA-2 (Fast ATA) defines the faster transfer rates used in Enhanced IDE (EIDE). ATA-3 added interface improvements, including the ability to report potential problems.

Figure 4:
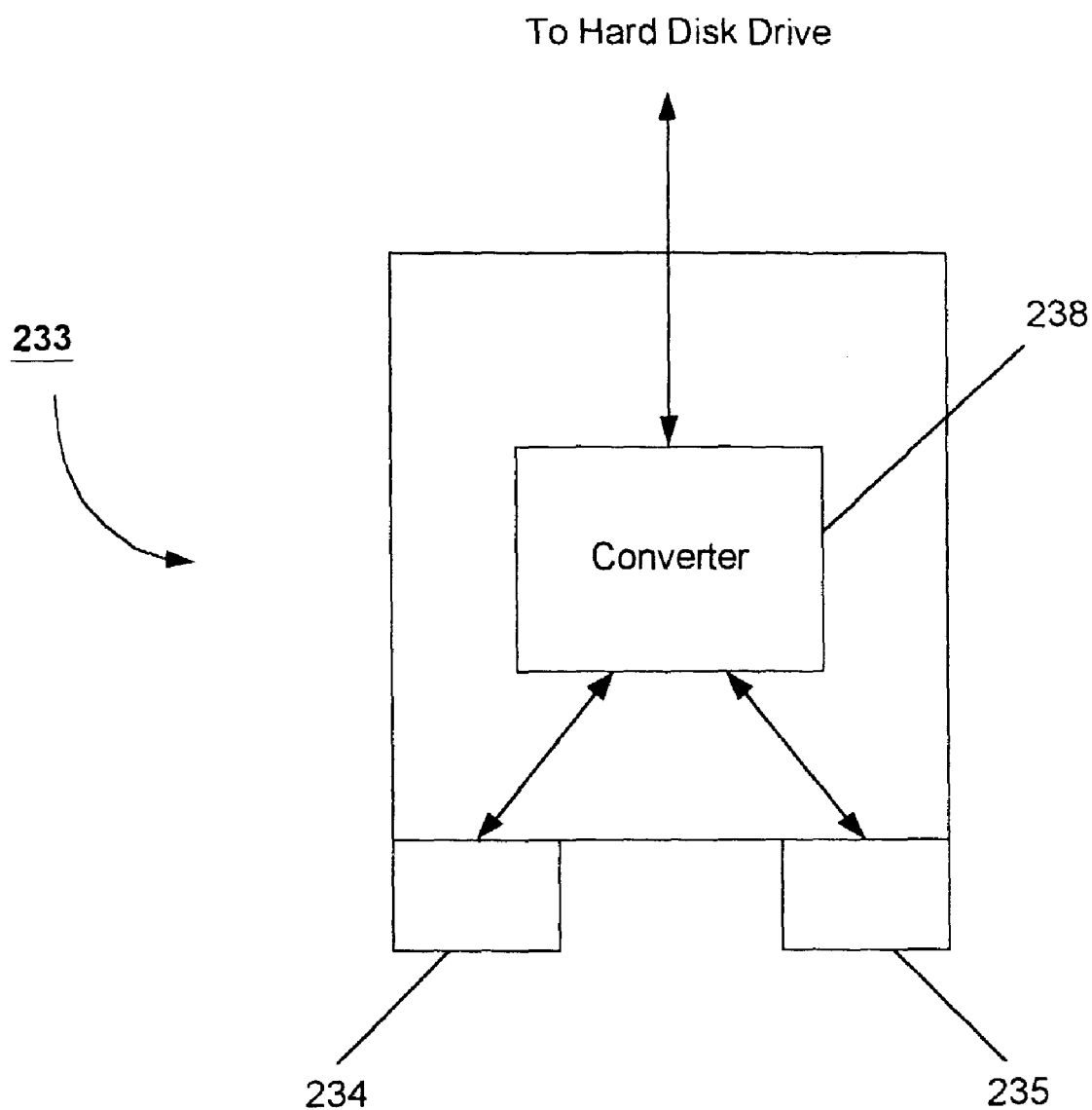
FIG. 4 is a more detailed block diagram of a storage module interface in accordance with an embodiment of the present invention.

Referring back to FIG. 3, the HDD 231 is coupled to the interface 233. FIG. 4 is a more detailed block diagram of the interface 233 in accordance with an embodiment of the present invention. The interface 233 includes a converter 238 that can be electronically coupled to the HDD 231 and the two data connectors 234, 235. In an embodiment, the two data connectors 234, 235 implement the IEEE 1394 standard and the converter 238 converts IDE-standard data.(from the HDD 231) to IEEE 1394 standard data.

The IEEE 1394 standard defines two transfer methods, namely the isochronous transfer mode and the asynchronous transfer mode. The isochronous transfer mode ensures the transmission and reception of a predetermined amount of data in each communication cycle and is executive for the real-time transfer of image signal or voice signal, while the asynchronous transfer mode executes transmission and reception asynchronously with the communication cycle and is executive for transmitting and receiving the control commands and the file data whenever necessary. In each communication cycle time, the asynchronous mode has a lower priority in comparison with the isochronous mode.

Also in the IEEE 1394 standard, the configuration of the connection of the communication system can be automatically recognized. More specifically, in response to a change in the configuration of connection, resulting from the addition of a new device, the deletion of a connected device or the on/off operation of power supply of a connected device, the recognition of the configuration of connection of the newly constructed system is automatically executed along with the setting of the ID information for the device constituting such system.

Furthermore, the IEEE 1394 standard is provided with a function of relaying the data transmitted from each device. Thus the communication packet, transmitted from each device in the isochronous transfer mode or the asynchronous transfer mode, is transferred, by such relaying function, to all the devices on the communication system.

The 1394 interface provided in each device is constituted by a physical layer, a link layer and a bus management unit. The 1394 interface can accommodate data transfer rates of 100, 200 and 400 Mbps. The 1394 interface supporting an upper data transfer rate is constructed as to also support the lower data transfer rates. The 1394 interface also has a function of receiving data transmitting from a device and repeating such data to another device. Furthermore, the 1394 interface executes a process called bus resetting in the following manner.

First, after an automatic detection of a change in the connection configuration of the communication system, the 1394 interface resets the connection configuration that has been recognized up to this point. Secondly, the 1394 interface determines the mother-daughter relationship of the connected device, and recognizes the new connection configuration as a hierarchic connection relationship. Thirdly, the 1394 interface automatically sets the ID starting from terminal device in the communication system, and transmits the set information of the interface (for example connection relationship with the other device, supported data transfer rate, supplied or consumed electric power etc.) to the device present on the communication system. The process explained above is executed by the physical layer equipped in the 1394 interface.

The physical layer of the 1394 interface constantly monitors the change in the bias voltage applied to the communication port, and detects the change in the connection configuration by a change in such voltage. A device that has detected the change in the bias voltage transfers a signal, requesting a bus resetting, to the 1394 interfaces of other device. The above-mentioned bus resetting is started after all the devices have received the signal requesting the bus resetting. The above-mentioned bus resetting can also be activated, in addition to the activation by the change in the connection configuration, by a direct request from a device itself to the physical layer. The physical layer in addition has functions of encoding and decoding of the transmitted and received data by the DS-link method, and of mediation (arbitration) of the bus use right.

The link layer has functions of control of the asynchronous transfer mode and the isochronous transfer mode, generation and detection of a communication packet based on the asynchronous transfer mode and the isochronous transfer mode, generation and detection of an error detection code attached to each communication packet, generation of a cycle start packet for controlling the communication cycle etc. Also the bus management unit executes control of the functions of the physical and link layers, management of the band and the channel number in the isochronous transfer mode, management of the communication between an application and the link layer, and also management of the information relating to the connection configuration of the communication system, the data transfer rate and the power supply of each device.

Figure 5:
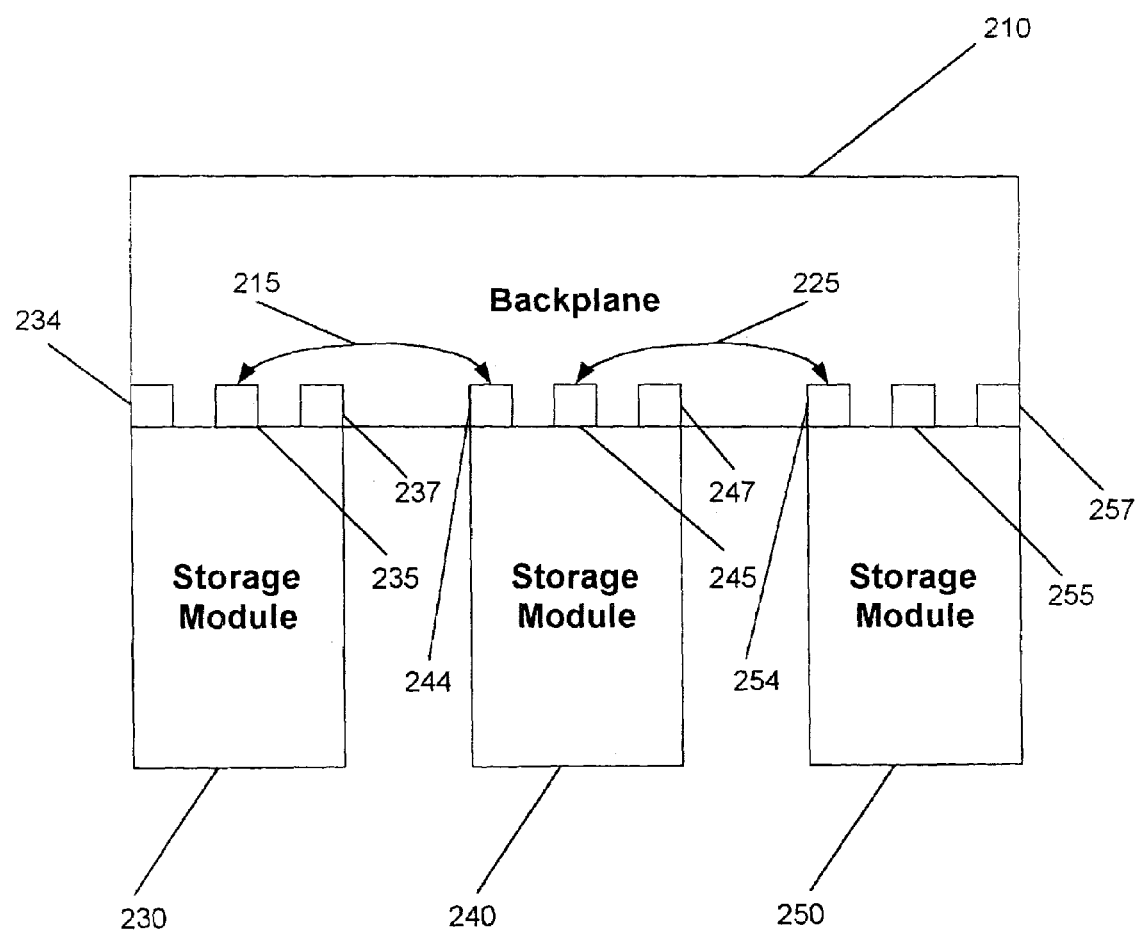
FIG. 5 shows a more detailed illustration of how the storage modules couple to the backplane in accordance with an embodiment of the present invention.

FIG. 5 shows a more detailed illustration of how the storage modules couple to the backplane 210 in accordance with an embodiment of the present invention. As can be seen in FIG. 5, the storage module 230 couples to the backplane 210 via the two data connectors 234, 235 and the power connector 237. In a similar fashion, storage module 240 couples to the backplane 210 via data connectors 244, 245 and power connector 247 and storage module 250 couples to the backplane 210 via data connectors 254, 255 and power connector 257. In an embodiment, circuitry in the backplance 210 provides for daisy chain-type data path connections 215, 225 between the storage modules 230, 240, 250 whereby data connectors 234, 235, 244, 245, 254, 255 comport with the IEEE 1394 standard. Accordingly, storage modules 230 and 240 communicate with each other via data connectors 235 and 244 and storage modules 240 and 250 communicate with each other via data connectors 245 and 254.

Figure 6:
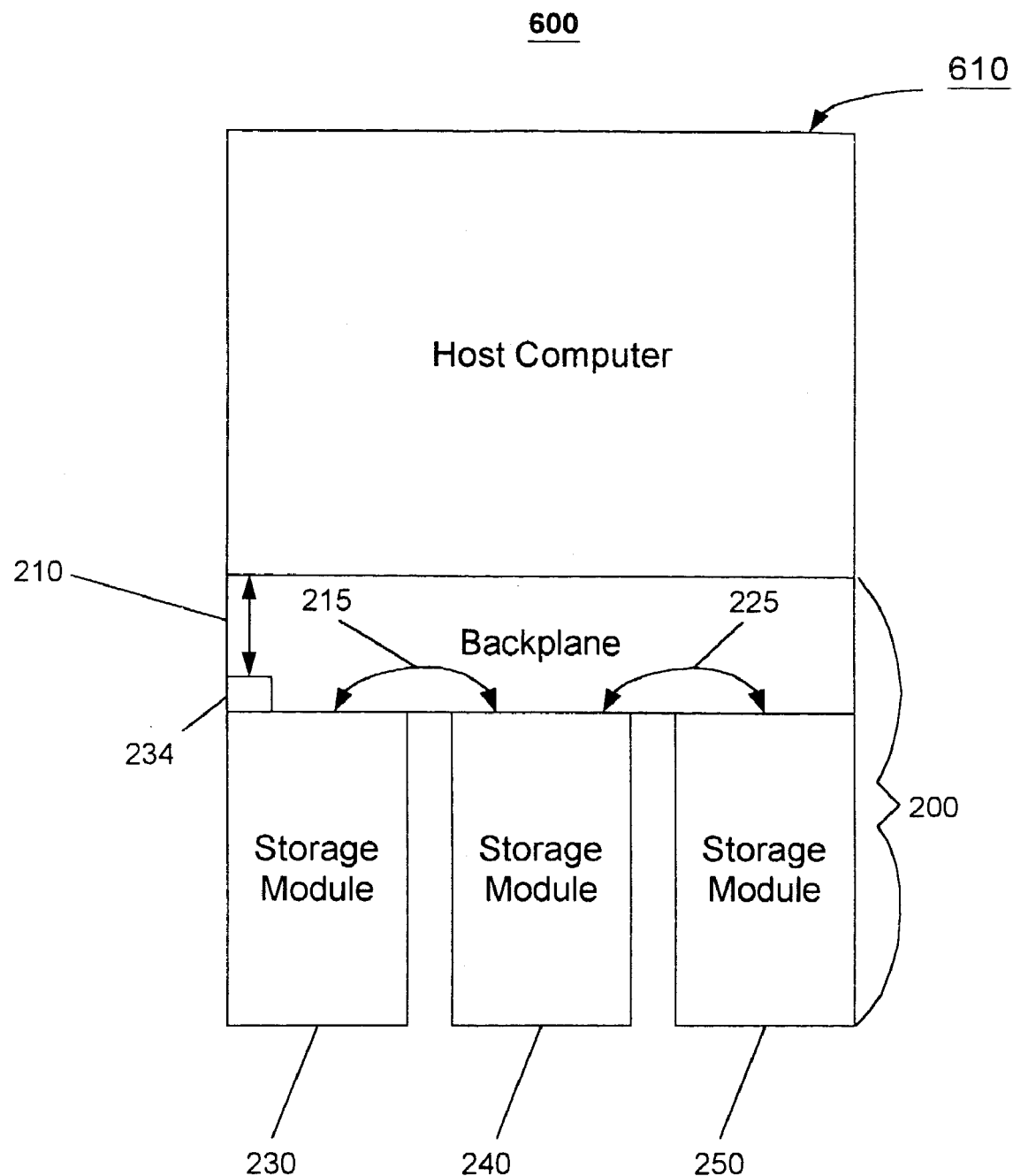
FIG. 6 shows an example of a system in accordance with an alternate embodiment of the present invention.

In an embodiment, the backplane 210 couples to a host computer. FIG. 6 shows an example of a system 600 in accordance with an alternate embodiment of the present invention. The system 600 includes a host computer 610 coupled to the expandable storage unit 200 via the backplane 210. Accordingly, the host computer 610 communicates with/accesses the storage module 230 via data connector 234. Consequently, since storage modules 240 and 250 are coupled to storage module 230 via daisy chain connections 215, 225, the host computer has access and can communicate with storage modules 240 and 250 as well.

Although the above-disclosed embodiment of the present invention is described as being utilized in conjunction with three storage modules one of ordinary skill in the art will readily recognize that the present invention could employ any number of storage modules while remaining within the spirit and scope of the present invention. Accordingly, since a virtually infinite amount of storage modules can be coupled to the backplane 210, the storage capacity of the host computer 610 can be literally expanded to an infinite amount by plugging additional storage modules into the backplane 210. Moreover, these additional modules can be added without incurring the expense and complexity of controllers and software.

Additionally, a hard drive from an existing PC could also be utilized in conjunction with the expandable modular storage unit in accordance with an embodiment of the present invention. For example, if a customer wants to purchase a new computer system and retain the data from the old system, the customer simply removes the hard drive from the old system and couples the hard drive to the expandable modular storage unit.

Figure 7:
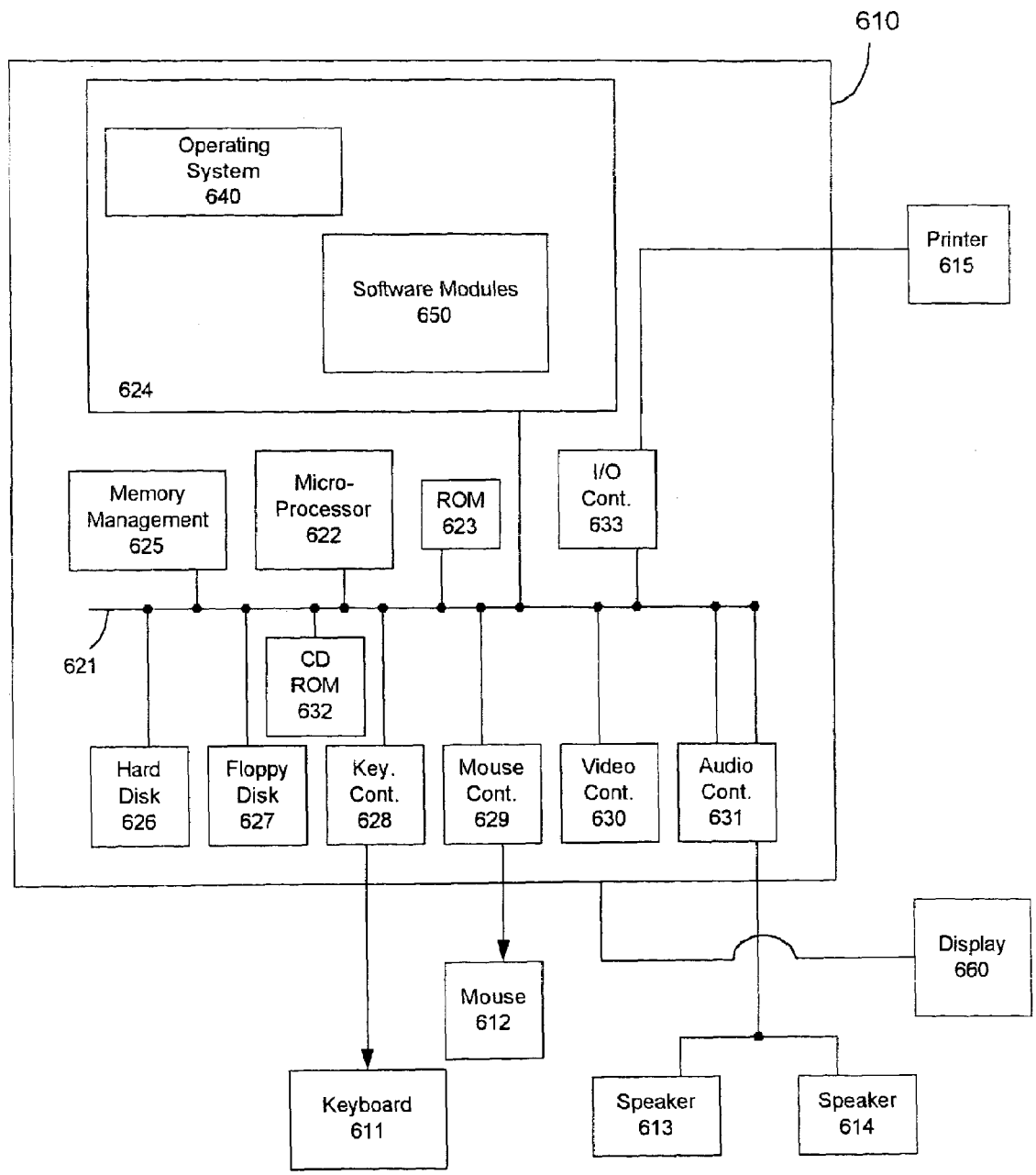
FIG. 7 shows an example of a computer system that could be utilized in conjunction with an alternate embodiment of the present invention.

The above-described embodiment of the present invention involves the implementation of a host computer 610 and the associated components. For an example of a host computer 610 that could be utilized in conjunction with an embodiment in accordance with the present invention, please refer to FIG. 7. In FIG. 7, a host computer 610, the host computer 610, including a keyboard 611, a mouse 612 and a printer 615 are depicted in block diagram form. The host computer 610 includes a system bus or plurality of system buses 621 to which various components are coupled and by which communication between the various components is accomplished.

The microprocessor 622 is connected to the system bus 621 and is supported by read only memory (ROM) 623 and random access memory (RAM) 624 also connected to the system bus 621. A microprocessor is one of the Intel family of microprocessors including the 386, 486 or Pentium microprocessors. However, other microprocessors including, but not limited to, Motorola's family of microprocessors such as the 68000, 68020 or the 68030 microprocessors and various Reduced Instruction Set Computer (RISC) microprocessors such as the PowerPC chip manufactured by IBM. Other RISC chips made by Hewlett Packard, Sun, Motorola and others may be used in the specific computer.

The ROM 623 contains, among other code, the Basic Input-Output system (BIOS) which controls basic hardware operations such as the interaction of the processor and the disk drives and the keyboard. The RAM 624 is the main memory into which the operating system 640 and software modules 650 are loaded. The memory management chip 625 is connected to the system bus 621 and controls direct memory access operations including, passing data between the RAM 624 and hard disk drive 626 and floppy disk drive 627. The CD ROM 632 also coupled to the system bus 621 is used to store a large amount of data, e.g., a multimedia program or presentation.

Various I/O controllers are also connected to this system bus 621. These I/O controllers can include a keyboard controller 628, a mouse controller 629, a video controller 630, and an audio controller 631. As might be expected, the keyboard controller 628 can provide the hardware interface for the keyboard 611, the mouse controller 629 can provide the hardware interface for mouse 612, the video controller 630 can provide the hardware interface for the display 660, and the audio controller 631 can provide the hardware interface for the speakers 613, 614. Another I/O controller 633 can enable communication with the printer 615.

One of ordinary skill in the art will readily recognize that the PC 610 can include a personal-digital-assistant (PDA), a laptop computer or a variety of other devices while remaining within the spirit and scope of the present invention.

An expandable modular storage unit for a computer system is disclosed. According to the present invention, the expandable modular storage unit includes a backplane capable of being coupled to a host computer system. A plurality of storage modules can be coupled to the backplane for communicating with the host computer system whereby the storage modules can communicate with each other and the host computer system. Through the use of the present invention, large amounts of data storage capability can be added to an existing system without the added expense of controller electronics and related software.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. An expandable modular storage unit comprising:
 a backplane including daisy chain connections for a daisy-chain of storage modules; and
 a plurality of storage modules coupled to the backplane wherein each storage module comprises a storage module interface board, and wherein the storage module interface board comprises at least two data connectors, wherein each storage module interface board coupled to the backplane is daisy-chained via the at least two data connectors on each storage module interface board and via the daisy-chain connections on the backplane such that a host computer system connected at one end of the daisy-chain is operable to communicate with a storage module of the plurality of storage modules connected to the backplane on another end of the daisy-chain via the at least two data connectors of the storage module interface board in between the ends of the daisy-chain, and wherein the at least two data connectors for each storage module interface board comprises a first connector operable to receive a signal from at least one of the daisy-chain connections on the backplane and a second connector operable to transmit the received signal on at least one of the daisy-chain connections on the backplane,
 wherein each of the plurality of storage modules include hard disk drives operable to transfer data stored in the hard disk drives to the host computer system via at least one of the daisy chain connections on the backplane and via the at least two data connectors on the respective storage module interface board; and
 wherein each storage module interface board further comprises a converter operable to convert data received from the at least one other storage module from one standard to another standard, wherein the one standard is IDE-standard and the another standard is IEEE 1394 standard.

2. The expandable modular storage unit of claim 1 wherein each storage module interface board and the at least two data connectors for each storage module interface board comport with an IEEE 1394 standard.

3. An expandable computer system comprising:
 a host computer system; and
 an expandable storage unit coupled to the host computer system wherein the expandable modular storage unit comprises:
 a backplane means for coupling the expandable storage unit to the host computer system via daisy-chain connections for a daisy-chain of storage module means; and
 a plurality of storage module means for storing data and transferring the data to the host computer system via at least one of the daisy chain connections on the backplane, wherein each of the plurality of storage module means comprises a storage module interface board coupled to the backplane, wherein the storage module interface board comprises at least two data connectors, further wherein the storage module interface board coupled to the backplane is daisy-chained via the at least two data connectors on the storage module interface board and via the daisy-chain connections on the backplane such that the host computer system connected at one end of the daisy-chain is operable to communicate with a storage module means of the plurality of storage module means connected to the backplane on another end of the daisy-chain via the at least two data connectors of the storage module interface board in between the ends of the daisy-chain, and wherein the at least two data connectors for each storage module interface board comprises a first connector operable to receive a signal from at least one of the daisy-chain connections on the backplane and a second connector operable to transmit the received signal on the daisy-chain connections on the backplane,
 wherein the plurality of storage module means include hard disk drives operable to transfer data stored in the hard disk drives to the host computer system via at least one of the daisy chain connections on the backplane and via the at least two data connectors on respective storage module interface boards; and
 wherein each storage module interface board further comprises a converter operable to convert data received from one standard to another standard.

4. The expandable computer system of claim 3 wherein the storage module interface board and the at least two data connectors for each storage module means comport with an IEEE 1394 standard.

5. The expandable computer system of claim 3 wherein the one standard is IDE-standard and the another standard is IEEE 1394 standard.

* * * * *